Dec. 28, 1926.  
H. W. EVANS  
1,612,623  
UNIDIRECTIONAL POWER TRANSMISSION MECHANISM  
Filed May 11, 1925
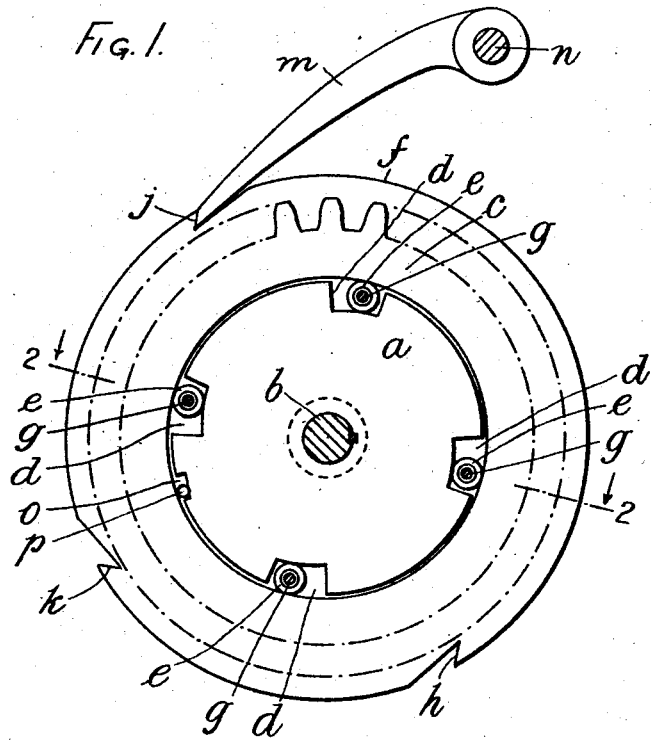
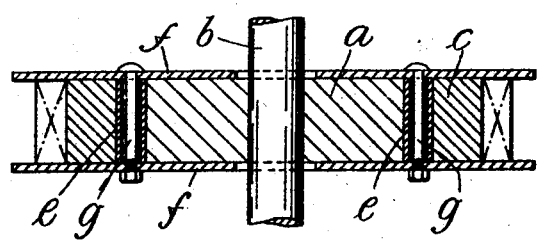
Inventor  
H. W. Evans  
by Wilkinson & Giusta  
Attorneys.

Patented Dec. 28, 1926.

1,612,623

UNITED STATES PATENT OFFICE.

HERBERT WILLIAM EVANS, OF BROMLEY, ENGLAND.

UNIDIRECTIONAL POWER-TRANSMISSION MECHANISM.

Application filed May 11, 1925, Serial No. 29,550, and in Great Britain May 20, 1924.

This invention relates to unidirectional power transmission mechanism of the kind in which the driving and driven members are adapted to be coupled together by the wedging of rollers against the inclined walls of recesses in which they are disposed and has for its object to provide improved mechanism adapted to connect, at will, a constantly rotating driving member with a driven member, and automatically to disconnect said members after predetermined angular movement. Such mechanism is adapted for use in connection with power-operated machinery adapted to perform, in succession, a series of steps, e. g. a machine for making concrete building blocks and the like, as set forth in my British specification No. 227,704.

It has previously been proposed to provide unidirectional power transmission mechanism comprising an annular driving member, a disc-like driven member disposed within the annular driving member, rollers disposed in tapering peripheral recesses in said driven member with their axes parallel with the common axis of rotation of the driving and driven members, transverse projections from said rollers, and means for restraining, at predetermined angular positions, the bodily revolution of said transverse projections about said common axis.

In such a construction the transverse projections have been so arranged as to pass through a pair of cheek plates disposed one on either side of, and thus supported relatively to, the driven member, and said cheek plates have been adapted to be engaged by a pawl or the like to arrest the bodily revolution of the transverse projections about the common axis of revolution.

According to the present invention, unidirectional power transmission mechanism of the kind set forth comprises a disc-like driven member keyed to a shaft and disposed within an annular gear wheel, said driven member being formed with a plurality of peripheral recesses the bottoms of which are tapered eccentrically, a plurality of tubular rollers disposed transversely one in each of said recesses, a pair of cheek-plates disposed one on each side of the driving member and connected together by means of a circular series of transverse rods passing one through each of said tubular rollers, and a pawl adapted to engage with the notches of a peripheral series formed on said cheek-plates.

The accompanying drawings illustrate one form of the invention intended especially for use on the concrete block making machine above mentioned, Figure 1 being a sectional elevation with one of the cheek plates removed, whilst Figure 2 is a section on the line 2—2, Figure 1.

As shown a disc-like driven member $a$ keyed to a shaft $b$ is disposed within an annular gear wheel $c$ and is formed with a plurality of peripheral recesses $d$ the bottoms of which are tapered eccentrically. In each recess $d$ is disposed a tubular roller $e$, adapted in the well known manner, to couple together the driving member $c$ and the driven member $a$ when the former is rotated towards the smaller ends of the peripheral recesses $d$, i. e. clockwise in Figure 1. On either side of the driving member $c$ and the driven member $a$ is a cheek plate $f$ of greater diameter than the gear wheel $c$, and passing through said cheek plates and through each of the hollow rollers $e$ is a transverse rod $g$. Each cheek plate is notched peripherally, as at $h \ j \ k$ so as to be adapted to be engaged by a pawl $m$ mounted on a shaft $n$, the notches $h \ j \ k$ being spaced apart at predetermined angular distances corresponding with the number of steps in the cycle of operations of the machine to which the mechanism is applied, and the angular movement necessary for their performance respectively.

Assuming that the gear wheel $c$ to be rotated continuously and the pawl $m$ to be riding on the peripheries of the cheek plates $f \ f$ the rollers $e$ . . . will be wedged into the smaller ends of the recesses $d$ . . . and the member $a$ will be driven in the well known manner, but when the pawl $m$ falls into a notch the cheek plates $f, f$ are held against rotation, the transverse rods $g$ . . . are engaged by the hollow rollers $e$ . . . as the latter are carried around and said rollers are thus held stationary so that further angular movement of the driven member $a$ releases the wedging of said rollers against the inner periphery of the annular gear wheel $c$ and thus disconnects the driving and driven members. When the shaft $n$ is rocked (e. g. by hand) to disengage the pawl $m$ from the notch the rollers $e$ are again wedged and the gear wheel $c$ and driven members $a$ are coupled together until they are automatically released when the pawl $m$ falls into the succeeding notch.

In some instances it may be necessary to prevent overriding from taking place, e. g. during the downward movement of the mould after delivery of the finished block in the machine above-mentioned and for this purpose the driven member $a$ may be formed with an additional tapered peripheral recess $o$ in which is disposed a roller $p$, the angular disposition of the recess $o$ relatively to the cams of said machine being such that as said mould descends after delivery of the finished block the smaller end of said recess will be lowermost and the roller $p$ will be in position to couple the driven member $a$ to the driving member $c$ if the former tends to move faster than the latter.

What I claim as my invention and desire to secure by Letters Patent is:—

In a unidirectional power transmission mechanism of the character described the combination of a pair of cheek plates, a central disc having a series of notches therein to form tapered grooves, a peripherally toothed ring arranged concentrically with said central disc and embraced between said pair of cheek plates, roller clutch members consisting of tubular rollers engaging in said tapered grooves between the contiguous faces of said disc and toothed ring, a series of transverse rods fixed to and connecting the cheek plates and passing one through each of said clutch rollers, and means operating simultaneously on the peripheries of both cheek plates for arresting or releasing the said plates as required.

HERBERT WILLIAM EVANS.